United States Patent
Desmet et al.

(10) Patent No.: US 11,207,682 B2
(45) Date of Patent: Dec. 28, 2021

(54) FLOW DISTRIBUTOR

(71) Applicant: PHARMAFLUIDICS NV, Ghent (BE)

(72) Inventors: Gert Desmet, Elewijt (BE); Sander Jespers, Lier (BE); Sander Deridder, Halle (BE)

(73) Assignee: PHARMAFLUIDICS NV, Ghent (BE)

(*) Notice: Subject to any disclaimer, the term of this patent is extended or adjusted under 35 U.S.C. 154(b) by 266 days.

(21) Appl. No.: 16/499,434

(22) PCT Filed: Mar. 30, 2018

(86) PCT No.: PCT/EP2018/058300
§ 371 (c)(1),
(2) Date: Sep. 30, 2019

(87) PCT Pub. No.: WO2018/178337
PCT Pub. Date: Oct. 4, 2018

(65) Prior Publication Data
US 2020/0215543 A1    Jul. 9, 2020

(30) Foreign Application Priority Data

Mar. 31, 2017    (EP) .................................. 17164445

(51) Int. Cl.
*B01L 3/00*        (2006.01)
*B01D 15/10*    (2006.01)
(Continued)

(52) U.S. Cl.
CPC ........ *B01L 3/502746* (2013.01); *B01D 15/10* (2013.01); *B01F 13/0066* (2013.01);
(Continued)

(58) Field of Classification Search
CPC .. B01D 15/10; B01F 13/0059; B01F 13/0066; B01F 2215/0036;
(Continued)

(56) References Cited

U.S. PATENT DOCUMENTS 6,923,907 B2    8/2005    Hobbs et al.
8,534,909 B2    9/2013    Guidat et al.
(Continued)

FOREIGN PATENT DOCUMENTS

CN    1646217 A    7/2005
CN    101264458 A    9/2008
(Continued)

OTHER PUBLICATIONS

"Design and evaluation of flow distributors for microfabricated pillar array columns" Vangelooven et al, Lab on a chip (Year: 2009).*

(Continued)

*Primary Examiner* — Jennifer Wecker
*Assistant Examiner* — Jonathan Bortoli
(74) *Attorney, Agent, or Firm* — Workman Nydegger (57) ABSTRACT

A distributor is described for distributing a fluid flow from a smaller to a more broad fluid flow. It comprises a fluid input and a plurality of fluid outputs, and a channel structure in between the fluid input and the plurality of fluid outputs. The channel structure comprises alternatingly bifurcating channel substructures and common channel substructures wherein the substructures are arranged so that fluid exiting different channels from a bifurcating channel substructure mixes in a subsequent common channel substructure, and whereby fluid channels of the bifurcating channel substructure are arranged such that these do not contact the subsequent common channel substructure at the edges thereof.

14 Claims, 6 Drawing Sheets

(51) Int. Cl.
    *B01F 13/00* (2006.01)
    *B01J 19/00* (2006.01)
    *G01N 30/60* (2006.01)

(52) U.S. Cl.
    CPC ...... *B01J 19/0093* (2013.01); *G01N 30/6017* (2013.01); *B01F 2215/0036* (2013.01); *B01F 2215/0037* (2013.01); *B01J 2219/00889* (2013.01); *B01J 2219/00894* (2013.01); *B01L 2300/0864* (2013.01); *B01L 2400/086* (2013.01)

(58) Field of Classification Search
    CPC ............ B01F 2215/0037; B01F 5/0601; B01J 19/0093; B01J 2219/00889; B01J 2219/00894; B01J 2219/00896; B01J 2219/00898; B01L 2300/0816; B01L 2300/0864; B01L 2300/0867; B01L 2400/086; B01L 3/502707; B01L 3/502746; G01N 30/6017
    See application file for complete search history.

(56) References Cited

U.S. PATENT DOCUMENTS

| | | |
|---|---|---|
| 8,549,907 B2 | 10/2013 | Tonomura et al. |
| 2003/0150806 A1 | 8/2003 | Hobbs et al. |
| 2010/0078086 A1 | 4/2010 | Guidat et al. |
| 2011/0016967 A1* | 1/2011 | Tonomura ............ B01F 15/0264 73/196 |
| 2016/0279637 A1* | 9/2016 | Sarioglu ................. G01N 1/34 |

FOREIGN PATENT DOCUMENTS

| | | |
|---|---|---|
| DE | 3613683 C2 | 1/1990 |
| EP | 2273180 A1 | 1/2011 |
| GB | 2366529 A | 3/2002 |
| JP | 2005517197 A | 6/2005 |
| JP | 2012508643 A | 4/2012 |
| JP | 2016539331 A | 12/2016 |
| WO | 0188525 A1 | 11/2001 |
| WO | 2009123009 A1 | 10/2009 |

OTHER PUBLICATIONS

Vangelooven et al., "Design and Evaluation of Flow Distributors for Microfabricated Pillar Array Columns," The Royal Society of Chemistry, vol. 10, 2010, pp. 349-356.

European Search Report from EP Application No. EP17164445, dated Aug. 2, 2017.

International Search Report from PCT Application No. PCT/EP2018/058300, dated Apr. 26, 2018.

Office Action from corresponding Japanese Application No. 2019-553319, dated Jul. 29, 2021.

Office Action from corresponding Chinese Application No. 201880030758.6, dated Mar. 9, 2021.

* cited by examiner

FLOW DISTRIBUTOR

FIELD OF THE INVENTION

The invention relates to the field of fluidics. More specifically it relates to a flow distributor for distributing a fluid flow from a flow with a smaller fluid plug to a flow with a more broad fluid plug, as well as corresponding microfluidic devices, chromatographic systems and chemical reactors comprising such a distributor.

BACKGROUND OF THE INVENTION

The design of novel microfluidic flow distributors to make the transition from a narrow connection channel or tube to a wide separation or reaction channel and vice versa with a minimum of dispersion remains a topic of interest.

Maybe the most iconic microfluidic distributor is that proposed by the Regnier group on microfabricated CEC and LC columns, typically referred to as the bifurcating (BF) distributor. It is characterized by the fact that it consecutively splits each channel in 2 sub-channels, leading to $2^n$ distribution channels of equal length, where n is the number of consecutive splits. Whereas the distributor used was designed such that the velocity remained the same at every bifurcation level (necessitating the use of fairly broad distributor channels in the first few splitting stages), numerically studies showed that much less dispersion is obtained if the distributor channels remain equally wide at all bifurcation levels. An example of such a bifurcating distributor with channels remaining equally wide at all bifurcation levels is shown in FIG. 1(a).

Another type of distributors spreads the flow via a diverging section which is either empty or filled with microstructures (pillars). The presence of the pillars can reduce the dispersion losses with at least 50% compared to the case of an open diverging section. Another major improvement can be obtained if the pillars are stretched out in the radial direction, to promote radial dispersion. An example of such a radially-interconnected (RI) distributor is shown in FIG. 1(b). It clearly distinguishes from the bifurcating-type distributors where the flow paths in the distributor never contact again once they bifurcated.

Considering a BF-distributor of the type shown in FIG. 1a, i.e., with a constant channel width, the BF-distributor is irrevocably the distributor type requiring the smallest volume to perform the distribution task. Given that dispersion is generally strongly dominated by the volume of the system, this gives the BF-distributor an important advantage. Another clear advantage of the BF-distributor is that all flow paths have the same trajectory length, whereas the RI-distributor obviously has different flow path lengths (shorter through the center than through the sides).

An important drawback of the bifurcating-type distributor however is that it is very sensitive to local clogging. If one of the channel segments in the distributor gets clogged, all subsequent channels branching away from it will be affected, as they only receive liquid from the clogged "mother" segment. This is where the radially-interconnected-type distributors can be considered to be advantageous, because they can use their radial mixing and the fact that there is full contact between the different liquid streams at all levels to overcome such local clogging. A recent study looking at the clogging characteristics of different flow distributors therefore used computational fluid dynamics (CFD). They concluded that BF-distributors, due to their minimal volume, perform better than RI-distributors if no clogging is present, whereas it is only when substantial clogging (more than 50%) occurs in a channel that the RI-distributor can be expected to outperform the BF-distributor. That study was however conducted by considering systems with very wide channels, where the dispersion could be dominated by dispersion in the individual segments.

SUMMARY OF THE INVENTION

It is an object of embodiments of the present invention to provide distributors for distributing a fluid flow from a smaller fluid plug to a more broad fluid plug, wherein both a good dispersion behavior and a good clogging resistance is obtained.

The above object is obtained by a device and system according to embodiments of the present invention.

The present invention relates to a distributor for distributing a fluid flow from a smaller fluid plug to a more broad fluid plug, said distributor comprising a fluid input and a plurality of fluid outputs, and a channel structure in between the fluid input and the plurality of fluid outputs, the channel structure comprising alternatingly bifurcating channel substructures and common channel substructures wherein said substructures are arranged so that fluid exiting different channels from a bifurcating channel substructure mixes in a subsequent common channel substructure, and whereby fluid channels of the bifurcating channel substructure are arranged such that these do not contact the subsequent common channel substructure at the edges thereof.

The distributor may be a microfluidic distributor.

It is an advantage of embodiments of the present invention that the dispersion in the distributor according to embodiments of the present invention has a width dependency similar as a bifurcating distributor but is far less prone to negative effects resulting from clogging compared to the bifurcating distributor. The distributor according to embodiments of the present invention therefore combines the advantageous dispersion behavior provided by a bifurcating distributor, in combination with the recovery behavior for recovering from clogging obtained in a radially interconnected distributor.

The flow distributor may be referred to as a mixed mode or MM distributor. It is an advantage of embodiments of the present invention that in absence of clogging, the mixed mode distributor only produces a little more dispersion than the bifurcating distributor, but far less dispersion than the radially interconnected distributor. It is an advantage of embodiments of the present invention that the mixed mode distributor follows a width-dependency that is similar to that of the bifurcating distributor. It is an advantage of embodiments of the present invention that the distributor allows distributing the flow across wide beds, e.g. in the order of millimeters or centimeters. It is an advantage of embodiments of the present invention that the possibility to distribute appropriately across wide beds is independent of the flow rate.

The mixed mode distributor comprises of flow paths undergoing a succession of bifurcations, with contact zones arranged after each splitting stage wherein the different parallel flow paths come again in direct fluidic contact.

The flow distributor according to embodiments of the present invention furthermore show advantageous behavior over a bifurcating distributor since it is far less prone to clogging effects.

It is an advantage of embodiments of the present invention that the mixed mode distributor provides both the ability to cope with local clogging events and provides a good dispersion behavior in the absence of clogging.

The common channel substructure may be arranged such that its length axis is substantially perpendicular to a net forward flow of the structure and said edges of the common channel substructure correspond with the end points of the length axis. The angle between the length axis and the net forward flow may alternatively be different from substantially perpendicular, but advantageously the angles then are varied such that the net length of the different flow paths is equal.

The contact zones may be filled with flow distributor elements, e.g. flat-rectangular flow distributor elements, designed such that all parallel flow-through paths through the distributor have the same length.

At least one common channel substructure may comprise a common channel filled with a plurality of pillar elements arranged spaced from each other.

It is an advantage of embodiments of the present invention that common channel substructures comprising pillar elements result in contact zones having more possibilities for fluid redistribution, thus resulting in a better effect of recovering from clogging events.

The plurality of pillar elements in at least one common channel, i.e. contact zone, may be pillar elements aligned in an even number of rows wherein the radial positions of the centerlines of the different inter-pillar element spaces at every $n^{th}$ row match the outlets of the preceding bifurcation channels, while the radial positions of the centerlines of the different inter-pillar element spaces at every $n-1^{th}$ row match the centerlines of the pillars in the following row. The number of rows may be defined by n=2, 4, 6, . . . .

Each of the common channel substructures may be filled with a plurality of pillar elements arranged spaced from each other.

In each common channel, the pillar elements may be aligned in an even number n of rows wherein the radial positions of the centerlines of the different inter-pillar element spaces at every $n^{th}$ row match the outlets of the preceding bifurcation channels, while the radial positions of the centerlines of the different inter-pillar element spaces at every $n-1^{th}$ row match the centerlines of the pillars in the following row.

The number of rows of pillar elements in a common channel substructure closer to the inlet may be higher than the number of rows of pillar elements in a common channel substructure nearer to the outlet.

The pillar structures may have a rectangular, diamond-like or ellipsoidal shape.

No pillar structures may be present in the common channel of the common channel substructures.

The number of fluid outputs may be $2^m$ with m a natural number.

The present invention also relates to a microfluidic structure comprising a distributor as described above.

The microfluidic structure may be a separation structure for a chromatographic system.

The present invention furthermore relates to a chromatographic system comprising a microfluidic structure as described above.

The present invention also relates to a chemical reactor comprising a flow distributor as described above or a microfluidic structure as described above.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

BRIEF DESCRIPTION OF THE DRAWINGS

FIGS. 4(a) to 4(d) illustrate the effect of 70% clogging in the box indicated with an arrow (cf. FIG. 1a-d) on the species band just prior to the moment of elution for the (a) bifurcating (BF) (b) radially interconnected (RI) (c) mixed mode$_I$ (MM$_I$) (d) mixed mode$_{II}$ (MM$_{II}$) distributors, the latter two being according to an embodiment of the present invention. Only one half of each distributor is shown because of the symmetry line running through the center of each distributor. The dashed ovals denote the species that entered the clogged channel, the red curved arrow indicates the leakage of species from the unclogged area to the clogged area in the BF-distributor.

FIG. 8 illustrates volumetric variance $\sigma_v^2$ of the species bands recorded at the monitor line as a function of the degree of clogging in the red boxes indicated in FIG. 1 for the 500

μm wide (16 outlets) RI- (squares), MM$_I$- (triangles) and BF-distributors (diamonds). Flow rate=1.32 μL/min (corresponding to a linear velocity of 0.25 mm/s in the subsequent bed). The MM$_I$ distributor thereby is according to an embodiment of the present invention.

FIG. 9 illustrates a distributor according to an embodiment of the present invention. The drawings are only schematic and are non-limiting. In the drawings, the size of some of the elements may be exaggerated and not drawn on scale for illustrative purposes.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings, but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment but may. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to a "bifurcating distributor", reference is made to a distributor wherein the flow paths in the distributor never contact each other again, once they bifurcated. Where in embodiments of the present invention reference is made to "bifurcating" reference is made to the splitting of a channel in a number of sub-channels.

Where in embodiments of the present invention reference is made to a "radially interconnected distributor", after each split, all channels contact each other again by ending up in a common channel.

In a first aspect, the present invention relates to a distributor for distributing a fluid flow from a smaller fluid plug to a more broad fluid plug. Such a distributor may be used for any suitable application such as for example in chromatographic applications, although embodiments are not limited thereto. The distributor comprises a fluid input and a plurality of fluid outputs, and a channel structure in between the fluid input and the plurality of fluid outputs. The channel structure comprises alternatingly bifurcating channel substructures and common channel substructures wherein said substructures are arranged so that fluid exiting different channels from a bifurcating channel substructure mixes in a subsequent common channel substructure. Fluid channels of the bifurcating channel substructure furthermore are arranged such that these do not contact the subsequent common channel substructure at the edges thereof. In other words, the fluid channels of the bifurcating channels end in the common channel substructure in such a way that fluid flowing from that channel at the exit of that channel can flow in two directions in the common channel. The common channel substructure may be considered as being arranged such that its length axis is perpendicular to a net forward flow of the structure and such that the edges of the common channel substructure correspond with the end points of the common channel substructure along the length axis.

Distributors according to embodiments of the present invention can be referred to as mixed mode distributors. At least one common channel substructure may comprise a common channel filled with a plurality of pillar elements arranged spaced from each other. Such pillar elements may be any suitable pillar elements for use in microfluidic channels such as for example rectangular shaped pillar elements, but also circular shaped pillar elements, hexagonal shaped pillar elements, diamond shaped pillar elements, elliptical shaped pillar elements, etc. In some embodiments, all common channel substructures may be filled with pillar elements. The distribution of the pillar elements and the type of pillar elements used may be the same or may be different for all common channel substructures. The distributor may be made in commonly used materials for distributors. Furthermore, the dimensions of the channels and pillar elements used may be as known for distributors.

In particular embodiments wherein pillar elements are used in the common channel, the plurality of pillar elements in at least one common channel may be pillar elements aligned in an even number of rows wherein the radial positions of the centerlines of the different inter-pillar element spaces at every $n^{th}$ row match the outlets of the preceding bifurcation channels, while the radial positions of the centerlines of the different inter-pillar element spaces at every $n-1^{th}$ row match the centerlines of the pillars in the following row. The radial positions of the centerlines of the different inter-pillar element spaces at every $n^{th}$ row match the outlets of the preceding bifurcation channels, while the radial positions of the centerlines of the different inter-pillar element spaces at every $n-1^{th}$ row match the centerlines of the pillars in the following row.

Figure 9:
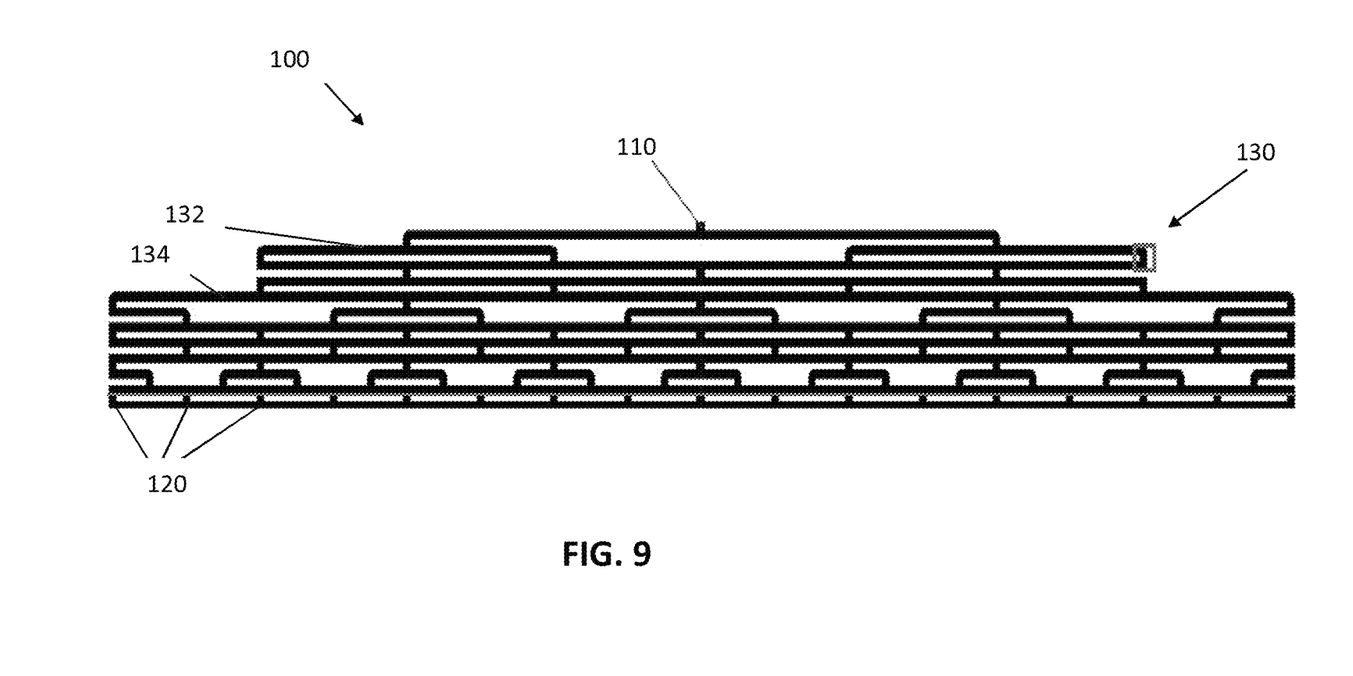

In some embodiments, the number of rows of pillar elements in a common channel substructure closer to the inlet is higher than the number of rows of pillar elements in a common channel substructure nearer to the outlet. By way of illustration, embodiments of the present invention not being limited thereto, an exemplary distributor 100 is shown in FIG. 9, the distributor 100 comprising an input a fluid input 110, a plurality of fluid outputs 120, a channel structure 130 in between the fluid input 110 and the plurality of fluid outputs 120. The channel structure 130 according to embodiments of the present invention comprises alternatingly bifurcating channel substructures 132 and common channel substructures 134 wherein said substructures 132, 134 are arranged so that fluid exiting different channels from a bifurcating channel substructure 132 mixes in a subsequent common channel substructure 134, and whereby fluid channels of the bifurcating channel substructure 132 are arranged such that these do not contact the subsequent common channel substructure 134 at the edges thereof.

In one aspect, the present invention also relates to a microfluidic structure comprising a distributor as described above. The microfluidic structure further may comprise a further channel section, such as for example a separation channel section. In some embodiments, a second distributor also may be used, similar to the first or different thereof, for reducing the width of the fluid plug again. Features and advantages of the distributor described in the first aspect also are applicable to the microfluidic structure as a whole. One example of a microfluidic structure according to this aspect is a separation structure for a chromatographic system.

In a further aspect, the present invention also relates to a chromatographic system comprising a microfluidic structure as described above. More generally, the present invention also relates to a chemical reactor comprising such a microfluidic structure.

By way of illustration, embodiments of the prevent invention not being limited thereto, a quantitative assessment of the advantage of mixed mode distributors of particular examples of embodiments of the present invention are discussed, by comparing the dispersion characteristics to representatives of the bifurcating and radially interconnected distributors. The assessment was performed numerically using computational fluid dynamics (CFD). Unless mentioned otherwise, all distributors had the same inlet and the same number of outlet ports and are subject to the same flow rate, i.e. a typical flow rate for microfabricated LC columns. To allow investigating a high number of conditions and geometries in a reasonable time, all simulations were done in 2-D, neglecting the additional dispersion one can expect from the top and bottom wall that are present in practice. Including this effect would have added an extra variable and would have consumed roughly a 10- to 100-fold of computational time (depending on the selected aspect ratio of the channels). It has furthermore been demonstrated in literature that the additional 3D dispersion can be considered as an independent extra term, especially when the channels have a high aspect-ratio, i.e. when the channels that are significantly deeper than wider, which is anyhow the condition resulting from a design aiming at a minimal distributor volume (keeping the depth of the channels constant). Since the extra dispersion from the top and bottom wall contribution can be expected to be proportional to the time spend in the distributor, and since this grows from BF over MM to the RI-distributor, it can be inferred the addition of this effect will only enhance the presently observed differences.

Figure 1:
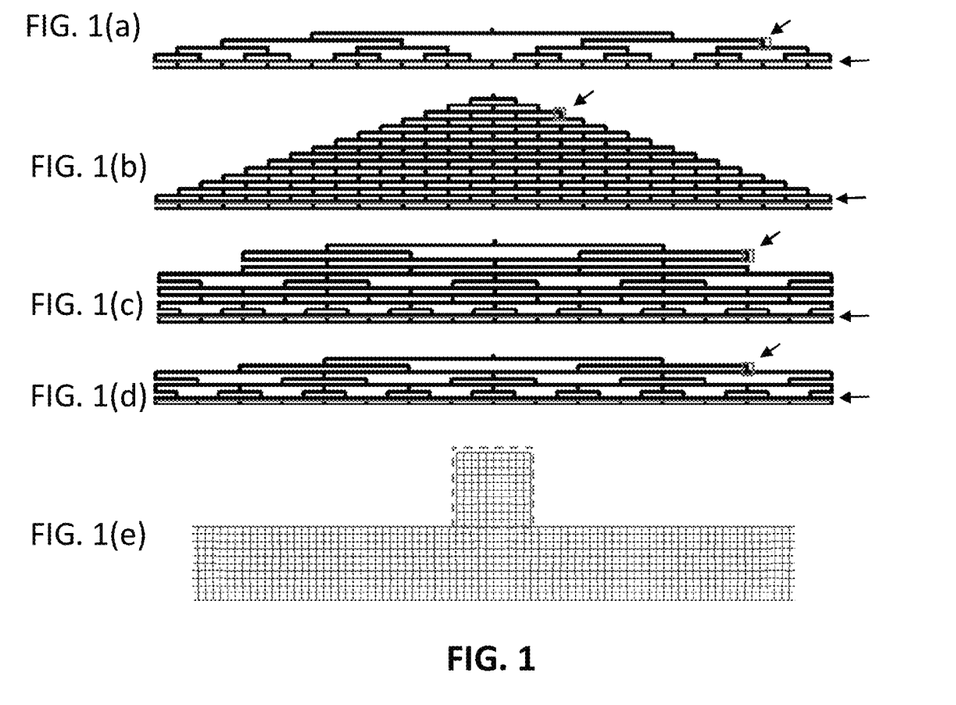
FIGS. 1(a) to 1(e) illustrate a bifurcating (BF) distributor geometry (a) and a radially interconnected (RI) distributor geometry (b) as known from prior art as well as mixed mode distributors according to embodiments of the present invention. In drawing (e) a zoomed view of the inlet of the distributors and the grid size and shape. The dashed red box contains the 100 grid cells forming the species injection box.

FIG. 1$a$-$d$ shows the different considered distributor geometries, i.e. the BF, $MM_I$, $MM_{II}$, and RI-distributors, respectively. The line indicated with the arrow in each of the distributors depicts the species monitor line, used to detect the species plug exiting the distributors. Each distributor was also provided with a porous zone at the 4-outlet-level, in the outer most channel (see boxes indicated with an arrow in FIGS. 1$a$-$d$). This zone had a tunable permeability, allowing to easily change the local flow resistance to simulate different degrees of clogging in the distributor without having to make different drawings. For symmetry reasons, only half of the geometry is simulated (see e.g., FIG. 2 further on).

FIG. 1$e$ shows a zoomed view of the inlet of each of the distributors, as well as an example of the employed computational grid (mesh) size and shape. The dashed box delimits the cells which are part of the injection box (100 cells in total). The cells in this injection box are patched with 1% species as the starting condition for the simulation. The flat-rectangular distributor elements (used here as an alternative to radially-elongated diamonds) at the outlet of each distributor (and for the RI-distributor over the entire geometry) were 30 μm wide and 2.5 μm thick. For the BF- and MM-distributors, the length of the flat-rectangular distributor elements in a previous splitting step (when following the direction of fluid flow) was taken equal to twice the length of the elements after the splitting step plus the width of one distributor flow-through channel. These channels were 2.5 μm wide throughout the entire geometry for every distributor. The distributors all fed into a 5 cm long bed filled with the same flat-rectangular elements as used at the outlet of the distributor (see the row of pillars after the line indicated with the arrow in FIGS. 1$a$-$d$).

The fluid used in the simulations was liquid water. The flow rate was chosen so that a linear velocity of approximately 0.25 mm/s was achieved in the reaction channel following the distributor (a practically relevant linear velocity for microchip chromatography). The species that was traced during the simulations was water as well. This mixture of water in water was given a viscosity of 1.003 cP and a self-diffusivity of $10^{-9}$ m$^2$/s.

Before discussing the results, first the numerical methods are discussed that are used for simulating. All simulations were performed with Ansys® Workbench version 16.2 from Ansys, Inc., purchased from Ansys Benelux, Wavre, Belgium. Within this software platform all flow domains were drawn with Ansys® Design Modeler and meshed with Ansys® Meshing. All simulations were performed with Ansys® Fluent.

The mesh size was chosen such that the shortest flow domain contained 10 mesh cells. The mesh consisted of quadrilateral cells. To check mesh independency, a mesh containing cells half the original size, resulting in a quadruple cell count, was used. For the 500 μm wide BF-distributor, the difference in plate height recorded with this finer mesh was only 3.5% smaller than for the original mesh. It was therefore concluded the original mesh yields sufficient accuracy, at least for the present study.

The solver used fulfilled following conditions. First, the velocity fields were computed solving the Navier-Stokes equations using the segregated pressure-based steady-state solver. For the spatial discretization, the least squares cell-based method was used to calculate concentration gradients, the coupled scheme for pressure-velocity coupling, the second order interpolation scheme for pressure and second order upwind scheme for momentum. Boundary conditions were set to wall for the side walls and sides of the flat-rectangular pillars, the inlet plane was put at a fixed mass-flow rate and the outlet plane were set to outflow. The porous zone was set to interior.

Subsequently, the 100 mesh cells of the injection box were patched with 1% species. The transient solver, with first order implicit temporal discretization and second order upwind scheme for spatial discretization, was then used to solve the convection diffusion equation yielding the transient concentration field of species band migrating through the flow domain. A fixed time stepping method with 10000 steps of size $1.10^{-6}$ s was used.

All simulations were performed on Dell Power Edge R210 Rack Servers each equipped with an Intel Xeon x3460 processor (clock speed 2.8 GHz, 4 cores) and 16 Gb, 1333 MHz ram memory, running on Windows server edition 2008 R2 (64-bit). Simulations of the steady-state velocity field in the aforementioned geometries took about 1 hour, while the transient species concentration field simulations took about 24 hours.

For each simulation, the mass fraction of species passing the "monitor" line (see red lines in FIGS. 1a-d) was recorded as a function of time. From the resulting peaks, the time-based variance ($\sigma_t^2$) and mean elution time ($\bar{t}$) were calculated using the mathematical moments of the peaks.

$$\bar{t} = \int t \cdot c(t) dt$$

$$\sigma_t^2 = \int (t-\bar{t})^2 \cdot c(t) dt = \int t^2 \cdot c(t) dt - \bar{t}^2$$

wherein c(t) is the mass fraction of species as a function of time. From these values, the volumetric variance ($\sigma_v^2$) can be calculated with $$\sigma_v^2 = \sigma_t^2 \cdot F^2$$

Using $\sigma_v^2$ (which contains information of F) instead of $\sigma_t^2$ as a measure of the peak width eliminates the influence the flow rate has on the observed (time-based) peak width.

Initial Comparison.

Figure 2:
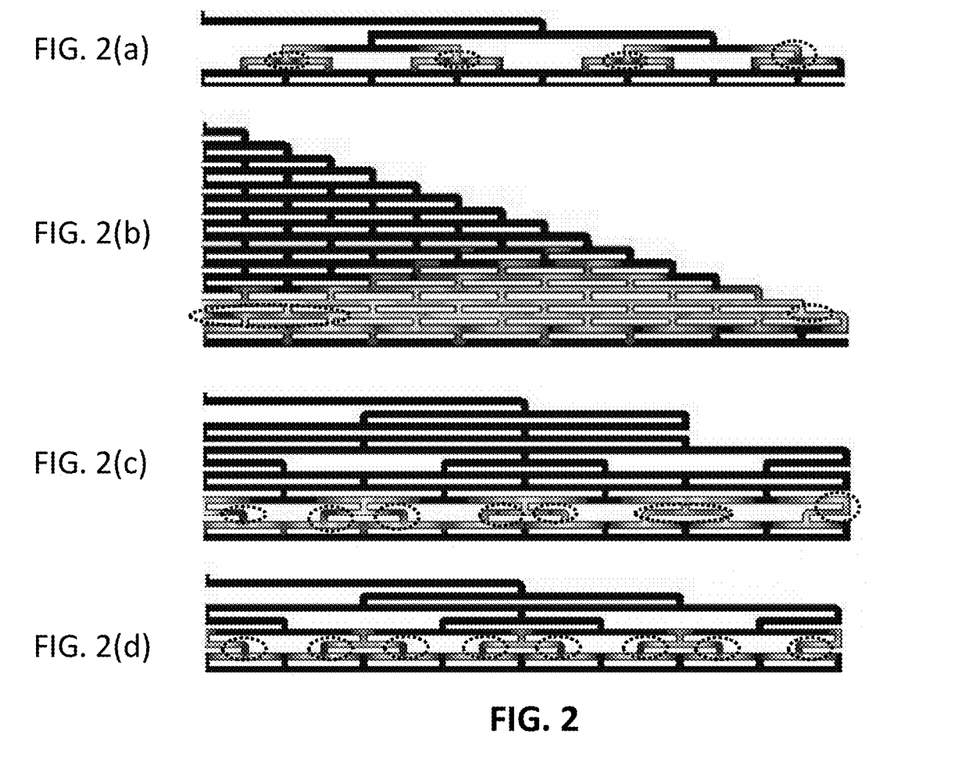
FIGS. 2(a) to 2(d) illustrate the spatial species distribution just prior to the moment of elution in the absence of clogging for the (a) bifurcating (BF) (b) radially interconnected (RI) and (c) mixed mode$_I$ (MM$_I$) and (d) mixed mode$_{II}$ (MM$_{II}$) distributors, the latter two being according to an embodiment of the present invention. Only one half of each distributor is shown because of the symmetry line running through the center of each distributor.
Figure 3:
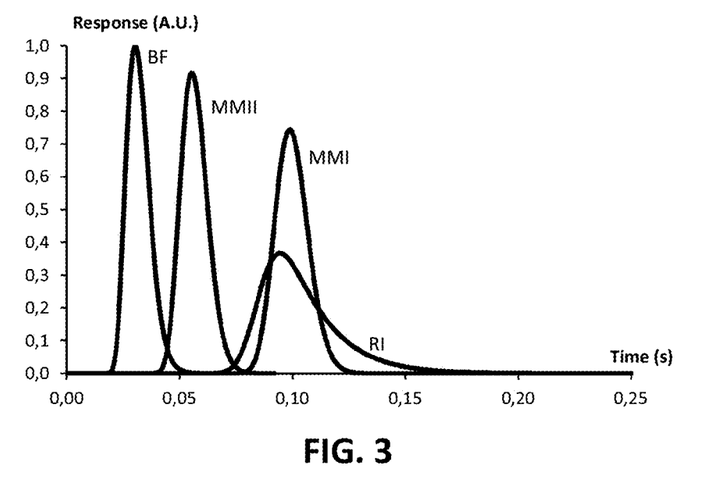
FIG. 3 illustrates time responses of the species bands recorded at the monitor line (cf. line and arrow FIG. 1a-d) in the absence of clogging for the cases shown in FIG. 2. The response is defined as the line integral of the mass fraction of species over the monitor line.

In a first set of simulations, the goal was to determine which of the four considered distributor types has the best performance in the absence of clogging. FIG. 2 shows a framed image of the species band at the moment of elution for each of the 4 considered distributor types. The dark parts in general show minimum concentration, except for the dark parts encircled by dotted lines which correspond with maximum concentration. The lighter parts correspond with intermediate concentrations. FIG. 3 shows the corresponding time responses (peaks) as recorded on the monitor line.

TABLE 1

|  | RI | MM$_I$ | MM$_{II}$ | BF |
|---|---|---|---|---|
| $\bar{t}$ (s) | 0.100 | 0.100 | 0.057 | 0.032 |
| $\sigma_v^2$ (nL$^2$) | 0.165 | 0.026 | 0.017 | 0.013 |
| Δp (bar) | 3.5 | 11.2 | 8.7 | 7.7 |

Table 1 shows the numerical values for $\bar{t}$ and $\sigma_v^2$ of each of the peaks, as well as the pressure drop between the inlet and the monitor line. As expected from its low volume and the uniform length of its flow-through channels, the BF-distributor leads to the narrowest peak ($\sigma_v^2=0.013$ nL$^2$) and elutes the fastest. The peak leaving the RI-distributor, on the other hand, is the widest, with the longest mean elution time and exhibits strong peak tailing. This obviously corresponds to its larger volume and is also reflected by the $\sigma_v^2$ of the RI peak, which is more than 10-fold higher than the BF peak, at 0.165 nL$^2$. The two mixed mode-distributors lead to peaks with intermediate mean elution times and widths, but without the tailing of the RI-distributor. In line with the difference in volume, the MM$_I$-distributor has a larger residence time and produces more dispersion than the MM$_{II}$-distributor ($\sigma_v^2=0.026$ nL$^2$ for MM$_I$ while $\sigma_v^2=0.017$ nL$^2$ for MM$_{II}$). Another important observation from FIG. 2 is that the BF-type distributor, as well as the MM-type distributors produce species bands that are perfectly uniform in the radial direction (reflecting the fact that all possible flow-through paths have the same length), whereas the RI-distributor clearly produces a warped band. The latter obviously is caused by the difference in flow-path length between the central and the outer region. Apparently, this difference cannot be overcome by the strong radial mixing allowed by the design of the RI-distributor.

Also shown in Table 1 are the pressure drops over the distributors. Here, the RI distributor is more advantageous, because the flow is very rapidly divided over many flow paths so that the local velocity (which obviously is highest at the inlet) drops rapidly. This is not the case in the BF-distributor, where the highest flow rates (F/2 after first bifurcation, F/4 after $2^{nd}$ bifurcation, . . . ) are maintained over the longest distance (=length of flow-through channels). As a consequence, the BF-distributor requires a larger pressure-drop. The two MM-type distributors have even a larger pressure drop, because of the presence of the contact zones generating an extra pressure drop.

If the extra pressure-drop of the MM-distributor would be an issue, designs are available wherein the flow-through channels are widest near the inlet and become narrower towards the exits. The optimal variation of the channel width will depend on the compromise between the extra dispersion and the pressure drop.

The next set of simulations mainly aimed at determining which of the two new distributors (MM$_I$ or MM$_{II}$) performs best in the presence of clogging. For these measurements, the porous zone in the red boxes shown in FIGS. 1a-d was tuned to reflect a 70% clogging (=70% of the channel cross section area was closed over a length of 2.5 µm) of the outermost channel at the 4-outlet-level (FIG. 1).

TABLE 2

|  | RI | MM$_I$ | MM$_{II}$ | BF |
|---|---|---|---|---|
| $\bar{t}$ (s) | 0.100 | 0.100 | 0.061 | 0.040 |
| $\sigma_v^2$ (nL$^2$) | 0.271 | 0.223 | 0.532 | 0.450 |

Figure 4:
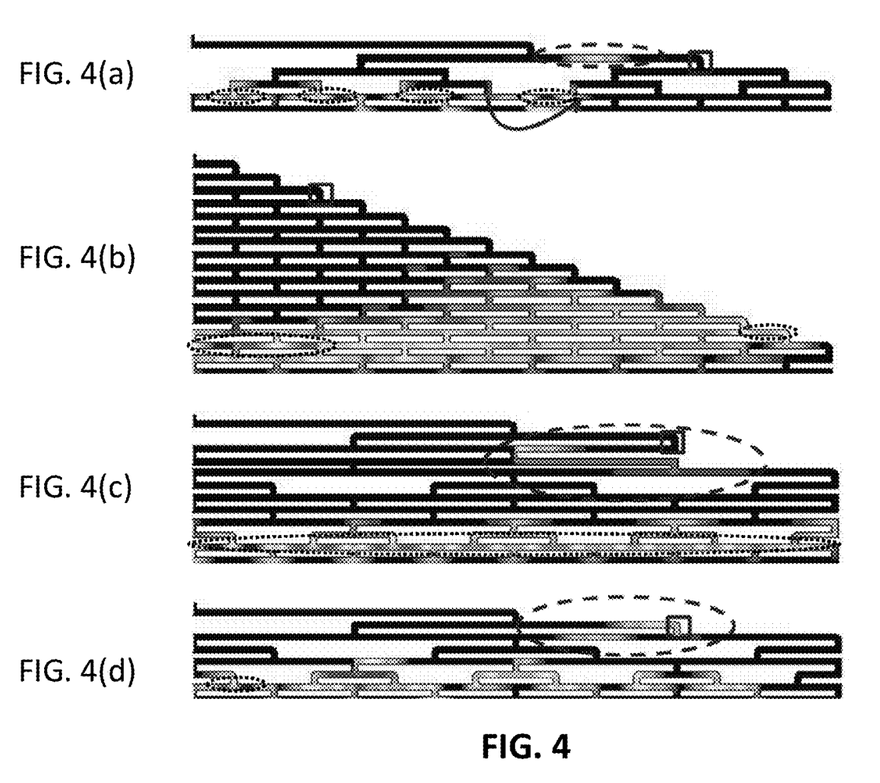
Figure 5:
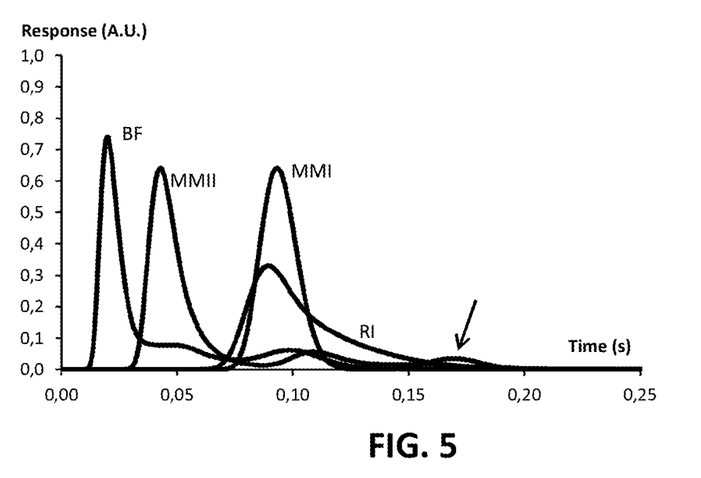
FIG. 5 illustrates time responses of the species bands recorded at the monitor line for the cases shown in FIG. 4 (70% clogging). The response is defined as the line integral of the mass fraction of species over the monitor line. The arrow shows the extra peak appearing for the MM$_I$-distributor according to an embodiment of the present invention caused by the species that entered the clogged channel and hence leave the distributor later.

FIGS. 4 and 5 show the bands at the moment of elution from the distributors and the corresponding peaks, respectively, Table 2 shows the numerical values for $\bar{t}$ and $\sigma_v^2$ of each peak. In FIG. 4, the dark parts in general show minimum concentration, except for the dark parts encircled by dotted lines which correspond with maximum concentration. The lighter parts correspond with intermediate concentrations. As can be noted, the peak from the BF-distributor becomes considerably wider ($\sigma_v^2$=0.45 nL$^2$) and shows an extreme tailing and asymmetry compared to the non-clogged case in FIGS. 2a-3a. The reason for this is that the BF-distributor has no flow paths going around the clogging and can hence not correct for errors. Part of the injected species even clearly get stuck in the region near the congestion (see added dashed oval). This also explains why the mean elution time becomes longer than in the non-clogged case.

On the other hand, the clogging has hardly any effect on the peak shape for the RI-distributor. The peak width ($\sigma_v^2$=0.271 nL$^2$), mean elution time, and symmetry are all almost identical to the results obtained without clogging. This confirms the excellent ability of RI-type distributors to cope with local clogging events, which is due to its strong radial mixing and the many different flow paths the fluid can take to circumvent the clogged area.

Again, the MM-distributors show an intermediate behavior. However, whereas the MM$_{II}$-distributor performs close to the unfavorable behavior of the BF-distributor (the $\sigma_v^2$ increased to 0.532 nL$^2$), the MM$_I$-distributor performs better ($\sigma_v^2$=0.223 nL$^2$). Here again, the explanation can be found in the geometry of the distributors. The contact zones in the MM$_{II}$-distributor are minimally small and reduced to a single flow-through channel, giving the fluid only limited possibility to compensate for errors. In the MM$_I$-distributor, three of such channel layers are present in each contact zone, giving the fluid much more time to redistribute across the entire width of the distributor. To understand this further, it is instructive to compare the bands leaving the MM$_I$- and MM$_{II}$-distributors in FIG. 4. Whereas the band leaving the distributor in the MM$_I$-distributor substantially fills the entire width of the channel (reflecting the ability of this distributor to overcome the obstruction blocking a branch feeding the most rightward part of the distributor), the band in the MM$_{II}$-distributor clearly hasn't yet been able yet to reach the most rightward part of the distributor when leaving the distributor.

Since the MM$_{II}$-distributor is outperformed by the BF-distributor under ideal circumstances (no clogging) and by the MM$_{II}$-distributor when clogging is possible, it was decided to omit this design from all further calculations.

Figure 6:
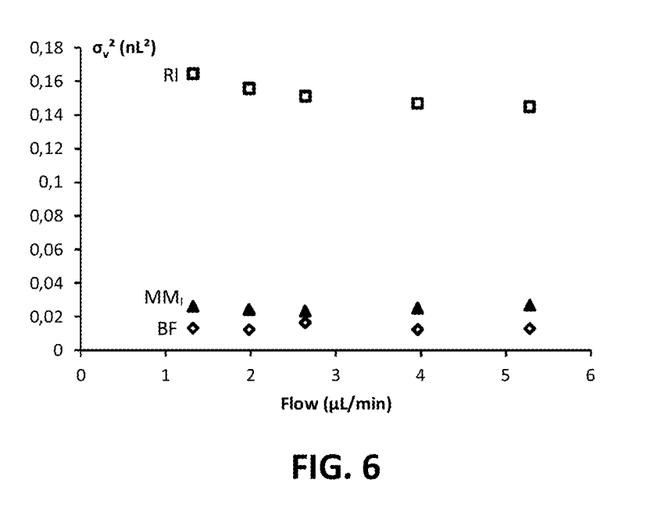
FIG. 6 illustrates volumetric variance $\sigma_v^2$ of the species band recorded at the monitor line as a function of the applied flow rate for the RI- (squares), MM$_I$- (triangles) and BF- (diamonds) distributors (width=500 μm, 16 outlets) in the absence of clogging. The MM$_I$ distributor thereby is according to an embodiment of the present invention.

For the three distributors that remained under consideration (BF, RI, and MM$_I$), the effect of the flow rate on the volumetric variance $\sigma_v^2$ of the bands leaving the distributor was examined. These simulations were conducted in the absence of clogging, to obtain the most simple and direct insight. Five different flow rates were applied to each of the distributors: 1.32 µL/min (corresponding to the optimal linear velocity of 0.25 mm/s for chromatography in the reaction channel following the distributor), 1.98 µL/min, 2.64 µL/min, 3.96 µL/min, and 5.28 µL/min. The results of these calculations are shown in FIG. 6 and confirm the observations from FIGS. 2-3 and Table 1 (MM in between BF and RI, but much closer to the BF than to the RI).

It is also striking to observe that the $\sigma_v^2$-values are nearly independent of the applied flow rate for all three distributors. Trying to explain this, we considered the analytical expression for the dispersion in a single microfluidic channel. Admittedly, the latter may only be a very crude representation of the flow-through channels in the distributors, but the availability of an analytical expression at least allows to understand some of the dispersion dynamics. The volumetric variance of a band travelling through a straight tube under fully-developed and dispersion dominated laminar flow conditions is given by:

$$\sigma_v^2 = \alpha \cdot \frac{d_{tube}^4 \cdot F \cdot L}{D_m} \cdot \left[1 - \frac{1}{\beta L}(1 - e^{-\beta L})\right] \quad (1)$$

Where $\alpha$ is a constant depending on the geometry of the tube ($\alpha$=1/105 for a channel formed between two parallel plates) and $\beta$=15$\pi D_m$/F.

Using Eq. (1) to calculate $\sigma_v^2$ as a function of F, with $d_{tube}$=2.5 µm, $D_m$=1.10$^9$ m$^2$/s and L the length of the flow path from the inlet to any of the outlet points (RI=26.5 µm, BF=25.125 µm, MM$_I$=56.125 µm) shows that the dispersion in the flow-through channels is not fully-developed yet (i.e., $\sigma_v^2$/L is not yet a constant). In other words, the flow rate is so high that the factor between straight brackets in Eq. (1) still varies in a nearly inversely proportional way with F, thus approximately compensating for the linear F-dependency preceding the straight brackets. This then explains the near-constant $\sigma_v^2$-values in FIG. 6. It is only when L would be significantly larger, or F would be significantly smaller that the factor between straight brackets would converge to unity. In this way, the linear F-dependency of the first factor remains the only flow rate effect, and a linear relation between $\sigma_v^2$ and F would be achieved.

Since the flow rate obviously doesn't have a significant influence on $\sigma_v^2$, all subsequent simulations were done at a flow rate of 1.32 µL/min, as this corresponds to a practically relevant linear velocity.

Figure 7:
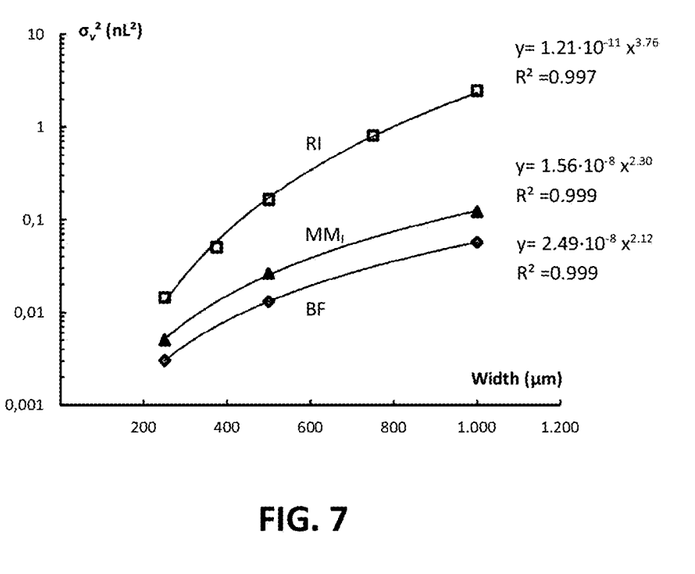
FIG. 7 illustrates volumetric variance $\sigma_v^2$ (data points) of the species band recorded at the monitor line as a function of the final distributor width (or number of outlets) in the absence of clogging (squares: RI, triangles: MM$_I$, and diamonds: BF) together with a power law fit (lines). The applied flow rate was adjusted for each distributor width to keep the same linear velocity (0.25 mm/s) in the subsequent bed. The MM$_I$ distributor thereby is according to an embodiment of the present invention.

To assess how the final distributor width affects the conclusions from the previous sections (no clogging case), the $\sigma_v^2$ was measured for different channel widths, again in the absence of clogging. The change in channel width was achieved by adding or eliminating layers to the distributors and by increasing or decreasing the number of outlets, in other words, the dimensions of the flow-through channels and the flat-rectangular pillars in the bed and the last rows of pillars in the distributor were kept the same. Note that, whereas the RI-distributor can have any number of outlets, the MM$_I$- and BF-distributors can only have 2$^n$ outlets, with n an integer. Moreover, when fewer than 8 outlets are considered, there is no difference between the MM$_I$- and BF-distributor. Hence, for the MM$_I$- and BF-distributor 3 cases were studied: 250 µm (8 outlets), 500 µm (16 outlets), and 1000 µm (32 outlets) wide final channels, while for the RI-distributor, the same 3 cases were studied, as well as an additional two cases of 375 µm (12 outlets) and 750 µm (24 outlets). The flow rate was scaled in proportion with the final distributor width, as each distributor is assumed to feed into a reaction or separation bed with a width equal to that of the distributor and we wanted to keep the linear velocity in this bed the same for all considered channel widths. The results of these simulations are shown in FIG. 7 (data points) as well as the corresponding fitted power law-curves.

Given the absence of clogging, the BF-distributor has the lowest $\sigma_v^2$ in each case, the RI-distributor has the highest, and the $MM_I$ produces variances that are larger the BF-distributor, but much smaller than those produced by the RI-distributors. The latter becomes more and more outspoken at the largest distributor widths, because the $\sigma_v^2$-values produced by the RI-distributor shows a proportionally greater increase with the distributor width than the $MM_I$- and BF-distributors. This is quantified by the power equation that can be fitted through the data points of each distributor type. As can be noted from the fittings in FIG. 7, the RI-distributor grows with the distributor width with a significantly higher power (3.8) compared to the $MM_I$- and BF-distributors (2.3 and 2.1 respectively). Roughly, this behavior can be understood as follows. To increase in width, the RI-distributor not only increases in width but also increases in length (given its overall triangular shape). Its volume hence increases according to width$^2$. Considering furthermore that the variance of any flow system in a first approximation scales with the square of its volume, we understand the observed width$^4$-increase. For the $MM_I$- and BF-distributors the volume grows essentially in the width and not in the length, essentially giving volume~width and hence $\sigma_v^2$~width$^2$, as is indeed approximated by the observed power law dependency.

The fact that the $MM_I$- and BF-distributors have a variance that increases with a power close to 2 ($\sigma_v^2$~width$^2$) is very beneficial, because the dispersion in the bed itself, can under conditions of a constant linear velocity, also be expected to vary according to width$^2$. This implies the relative contribution of the distributor to the overall dispersion will remain the same when trying to use ever wider channels. Obviously, this is a highly beneficial characteristic. The near-4th power dependency of the RI-distributor implies a totally different behavior, as the relative contribution of the distributor (increasing with width$^4$) to the total dispersion will eventually always overwhelm that of the bed (increasing with width$^2$).

Finally, the sensitivity to clogging of the different distributor types (BF, RI, and $MM_I$) was studied in more detail by considering step changes in the percentage of clogging degree in the porous zone indicated in FIGS. 1a-d (red box). The flow rate was kept constant at 1.32 µL/min in all simulations.

Figure 8:
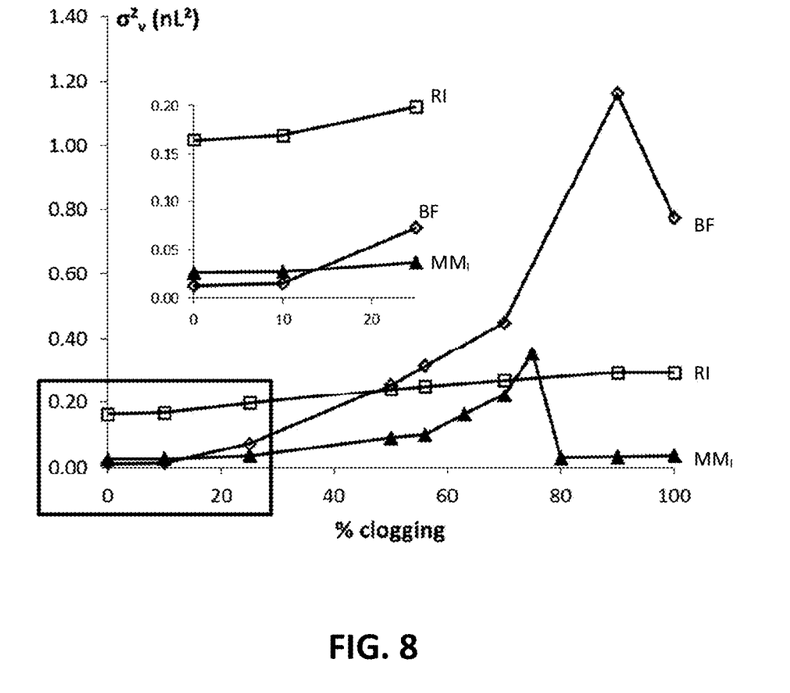

As can be seen in FIG. 8, the volumetric variance $\sigma_v^2$ (0.165 µL$^2$) of the RI-distributor at 0% clogging is approximately 10 fold higher than that of the BF- or $MM_I$-distributor ($\sigma_v^2$=0.165 µL$^2$ versus $\sigma_v^2$=0.013 µL$^2$ to 0.026 µL$^2$). However, when the degree of clogging increases, the $\sigma_v^2$-values of the RI-distributor rise only relatively slowly from 0.165 µL$^2$ to 0.295 µL$^2$. This is in sharp contrast with the BF-distributor which, as already stated in section 3.1, produces the lowest at 0% clogging ($\sigma_v^2$=0.013 µL$^2$) but exhibits a very steep rise in $\sigma_v^2$ when increasing the amount of clogging, reaching a maximum of 1.16 µL$^2$ at 90% clogging.

The variance produced by the $MM_I$-distributor at 0% clogging is almost double that of the BF-distributor at 0.026 µL$^2$ but this value rises much less steeply with the degree of clogging than the BF-distributor. As a consequence, the $\sigma_v^2$ of the $MM_I$-distributor drops below that of the BF-distributor at approximately 15% clogging. After this point, the $MM_I$-distributor stays the lowest of the three distributors until 75% clogging, where it briefly rises above the RI-distributor before falling back down to 0.031 µL$^2$ at 80% clogging.

The unexpected drop in the variance produced by of the $MM_I$ that occurs at 80% clogging can be explained as follows. Considering the small amount of species that enters the clogged channel (see dashed oval in FIG. 4), it is important to realize this leaves this channel only very slowly, as the velocity in the clogged channel is much lower than the velocity in the other channels due to the clogging. As a consequence, it gets diluted below the detection limit (<0.1% of the maximum of the peak) by the time it reaches the detector (or in our case the red monitor line). In other words, the second peak of the $MM_I$ signal in FIG. 5 (indicated by the small arrow) drops below the detection limit when the clogging degree exceeds 75%.

A similar effect occurs in the BF-distributor (cf. the species in the clogged channel leaving only very slowly), but is overshadowed by the asymmetry of the band that leaves the BF-distributor (FIG. 4). In fact, part of the species that flow through the unclogged channels leak into the channels below the clogging (red arrow FIG. 4), as the total pressure is lower there, before flowing out the distributor completely leading to heavily tailed peaks (FIG. 5) and thus high values for $\sigma_v^2$.

Obviously, the pattern of overtaking curves observed in FIG. 8 may be different when the clogging occurs on a different place, or when there are multiple clogging spots, or when the distributor width is different. Nevertheless, the general conclusions can be expected to remain the same, i.e., the BF-distributor will be superior at zero or very low % of clogging, whereas the MM-concept becomes advantageous as soon as the clogging becomes significant, because of its contact zones that allow for a redistribution of the flow after each bifurcation. The number of flow distributor rows (n) in these contact zones should be selected based on the probability for clogging. When it is deemed this probability is larger near the inlet, it seems straightforward to provide contact zones with a higher n near the inlet and with a lower n near the outlet.

The invention claimed is:

1. A distributor for distributing a fluid flow from a smaller fluid plug to a more broad fluid plug,
said distributor comprising a fluid input and a plurality of fluid outputs, and a channel structure in between the fluid input and the plurality of fluid outputs,
the channel structure comprising alternatingly bifurcating channel substructures and common channel substructures wherein said substructures are arranged so that fluid exiting different channels from a bifurcating channel substructure mixes in a subsequent common channel substructure,
wherein at least one common channel substructure comprises a common channel filled with a plurality of pillar elements arranged spaced from each other, and
whereby fluid channels of the bifurcating channel substructure are arranged such that these do not contact the subsequent common channel substructure at the edges thereof.

2. The distributor according to claim 1, wherein the common channel substructure is arranged such that its length axis is substantially perpendicular to a net forward flow of the structure and said edges of the common channel substructure correspond with the end points of the length axis.

3. The distributor according to claim 1, wherein the plurality of pillar elements in at least one common channel are pillar elements aligned in an even number of rows wherein the radial positions of the centerlines of the different inter-pillar element spaces at every nth row match the outlets of the preceding bifurcation channels, while the radial positions of the centerlines of the different inter-pillar element spaces at every n ith row match the centerlines of the pillars in the following row.

4. The distributor according to claim 1, wherein each of the common channel substructures is filled with a plurality of pillar elements arranged spaced from each other.

5. The distributor according to claim 4, wherein for each common channel, the pillar elements are aligned in an even number n of rows wherein the radial positions of the centerlines of the different inter-pillar element spaces at every nth row match the outlets of the preceding bifurcation channels, while the radial positions of the centerlines of the different inter-pillar element spaces at every n-lth row match the centerlines of the pillars in the following row.

6. The distributor according to claim 5, wherein the number of rows of pillar elements in a common channel substructure closer to the inlet is higher than the number of rows of pillar elements in a common channel substructure nearer to the outlet.

7. The distributor according to claim 1, wherein the pillar structures have a rectangular, diamond-like or ellipsoidal shape.

8. The distributor according to claim 1, wherein no pillar structures are present in the common channel of the common channel substructures.

9. The distributor according to claim 1, wherein the number of fluid outputs is (2m) with m a natural number.

10. The distributor according to claim 1, wherein the distributor is part of a chemical reactor.

11. A microfluidic structure comprising a distributor according to claim 1.

12. The microfluidic structure according to claim 11, the microfluidic structure being a separation structure for a chromatographic system.

13. The microfluidic structure according to claim 11, the microfluidic structure being part of a chemical reactor.

14. A chromatographic system comprising a microfluidic structure according to claim 11.

* * * * *